US010462652B2

(12) United States Patent
Nogawa

(10) Patent No.: US 10,462,652 B2
(45) Date of Patent: Oct. 29, 2019

(54) DEVICE PERFORMING A FUNCTION DEPENDING ON CONNECTED WIRELESS NETWORK

(75) Inventor: Hideki Nogawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 718 days.

(21) Appl. No.: 12/839,769

(22) Filed: Jul. 20, 2010

(65) Prior Publication Data

US 2011/0060833 A1   Mar. 10, 2011

(30) Foreign Application Priority Data

Sep. 4, 2009   (JP) ................................. 2009-205125

(51) Int. Cl.
*G06F 15/177* (2006.01)
*H04W 8/24* (2009.01)
*H04W 88/06* (2009.01)

(52) U.S. Cl.
CPC ............ *H04W 8/245* (2013.01); *H04W 88/06* (2013.01)

(58) Field of Classification Search
CPC ..... H04W 8/245; H04W 88/06; H04W 12/08; H04W 48/16; H04L 63/083; H04L 63/0236
USPC ........................................................ 709/225
See application file for complete search history.

(56) References Cited

U.S. PATENT DOCUMENTS

| | | | |
|---|---|---|---|
| 7,983,402 B2 | 7/2011 | Ohara et al. | |
| 2002/0032786 A1 | 3/2002 | Yamada et al. | |
| 2004/0204071 A1 | 10/2004 | Bahl et al. | |
| 2004/0235452 A1* | 11/2004 | Fischer | H04L 63/104 455/410 |
| 2004/0259544 A1* | 12/2004 | Amos | 455/435.1 |
| 2005/0044405 A1* | 2/2005 | Spraggs | 713/200 |
| 2005/0210031 A1* | 9/2005 | Kasatani | H04N 1/00127 |

(Continued)

FOREIGN PATENT DOCUMENTS

| | | |
|---|---|---|
| JP | 5-204562 | 8/1993 |
| JP | 2002-55729 | 2/2002 |

(Continued)

OTHER PUBLICATIONS

Intel's My WiFi makes my Internet yours. By Dong Ngo. CNET > Tech Industry, Jan. 12, 2009.*

(Continued)

*Primary Examiner* — William G Trost, IV
*Assistant Examiner* — Tan Doan
(74) *Attorney, Agent, or Firm* — Scully, Scott, Murphy & Presser, P.C.

(57) ABSTRACT

A device disclosed here is connectable to a first type of wireless network and a second type of wireless network. The device includes a communication section, a function section, a determination section and a function control section. If the determination section determines an external device to be included in one of the first type of wireless network and the second type of wireless network, the function control section permits the external device to use a first function, and if the determination section determines the external device to be included in the other of the first type of wireless network and the second type of wireless network, the function control section prohibits the external device from using the first function.

4 Claims, 2 Drawing Sheets

(56) References Cited

U.S. PATENT DOCUMENTS

| | | | |
|---|---|---|---|
| 2007/0025246 A1* | 2/2007 | Pirzada | H04W 84/02 370/230 |
| 2007/0124516 A1 | 5/2007 | Ohara et al. | |
| 2007/0294755 A1* | 12/2007 | Dadhia et al. | 726/11 |
| 2008/0086761 A1* | 4/2008 | Hardy et al. | 726/3 |
| 2008/0091175 A1* | 4/2008 | Frikart | H04L 63/061 604/891.1 |
| 2008/0100859 A1 | 5/2008 | Shirai | |
| 2008/0132231 A1 | 6/2008 | Balasubramanian | |
| 2010/0050238 A1* | 2/2010 | Fuccello | H04L 63/0236 726/4 |
| 2011/0014868 A1* | 1/2011 | Yun | H04M 1/7253 455/41.2 |

FOREIGN PATENT DOCUMENTS

| | | |
|---|---|---|
| JP | 2003008681 A | 1/2003 |
| JP | 2004-135258 A | 4/2004 |
| JP | 2006209504 A | 8/2006 |
| JP | 2007042015 A | 2/2007 |
| JP | 2008110564 A | 5/2008 |
| JP | 2008-167149 A | 7/2008 |
| JP | 2010-512128 A | 4/2010 |
| WO | 2007146858 A2 | 12/2007 |

OTHER PUBLICATIONS

Official Action dated Apr. 22, 2014 received from the Japanese Patent Office in related application JP 2013-160365.

* cited by examiner

DEVICE PERFORMING A FUNCTION DEPENDING ON CONNECTED WIRELESS NETWORK

CROSS REFERENCE TO RELATED APPLICATION

The present disclosure relates to the subject matter contained in Japanese patent application No. 2009-205125 filed on Sep. 4, 2009, which is expressly incorporated herein by reference in its entirety.

TECHNICAL FIELD

This disclosure relates to a device connectable to a wireless network. More particularly, the present disclosure relates to a device connectable to plural types of wireless networks.

BACKGROUND ART

For example, JP-A-2002-55729 discloses a device (PC) connectable to a wireless network and a wired network. When an external device such as a terminal device is included in the wired network, the external device is permitted to use a specific function of the device (for example, to use a specific application provided in the device). On the other hand, the external device is prohibited from using the specific function of the device described above when the external device is included in the wireless network.

JP-A-5-204562 discloses a printer having a first interface circuit and a second interface circuit respectively for wireless communication and wired communication. When the first interface circuit receives a signal from an upper level device, the printer permits the first interface circuit to receive print data and prohibits the second interface circuit from receiving print data. When the second interface circuit receives a signal from an upper level device, the printer prohibits the first interface circuit from receiving print data and permits the second interface to receive print data.

The disclosure of JP-A-2002-55729 and JP-A-5-204562 does not address the presence of plural types of wireless networks.

SUMMARY

As one of techniques of the present disclosure, there is provided a device connectable to a first type of wireless network including an access point and connectable to a second type of wireless network including a terminal device having an access point function, the device including: a communication section configured to communicate with an external device; a function section configured to executes a plurality of functions that can be used by the external device when the external device performs communication; a determination section configured to determine which of the first type of wireless network and the second type of wireless network includes the external device; and a function control section configured to permit or prohibit the use, by the external device, of a first function among the plurality of functions in response to a determination result of the determination section, wherein if the determination section determines the external device to be included in one of the first type of wireless network and the second type of wireless network, the function control section permits the external device to use the first function, and if the determination section determines the external device to be included in the other of the first type of wireless network and the second type of wireless network, the function control section prohibits the external device from using the first function.

A control method, a computer program for implementing the device and a computer readable medium storing the program are newly useful. Also, a system including the device and the external device described above is newly useful.

Accordingly, as one of advantages, the present disclosure can provide a device connectable to a plurality of types of wireless networks and capable of executing an appropriate process.

The above-noted advantage and other advantages will be discussed in detail with reference to the accompanying drawings.

DESCRIPTION OF THE PREFERRED EMBODIMENT

Figure 1:
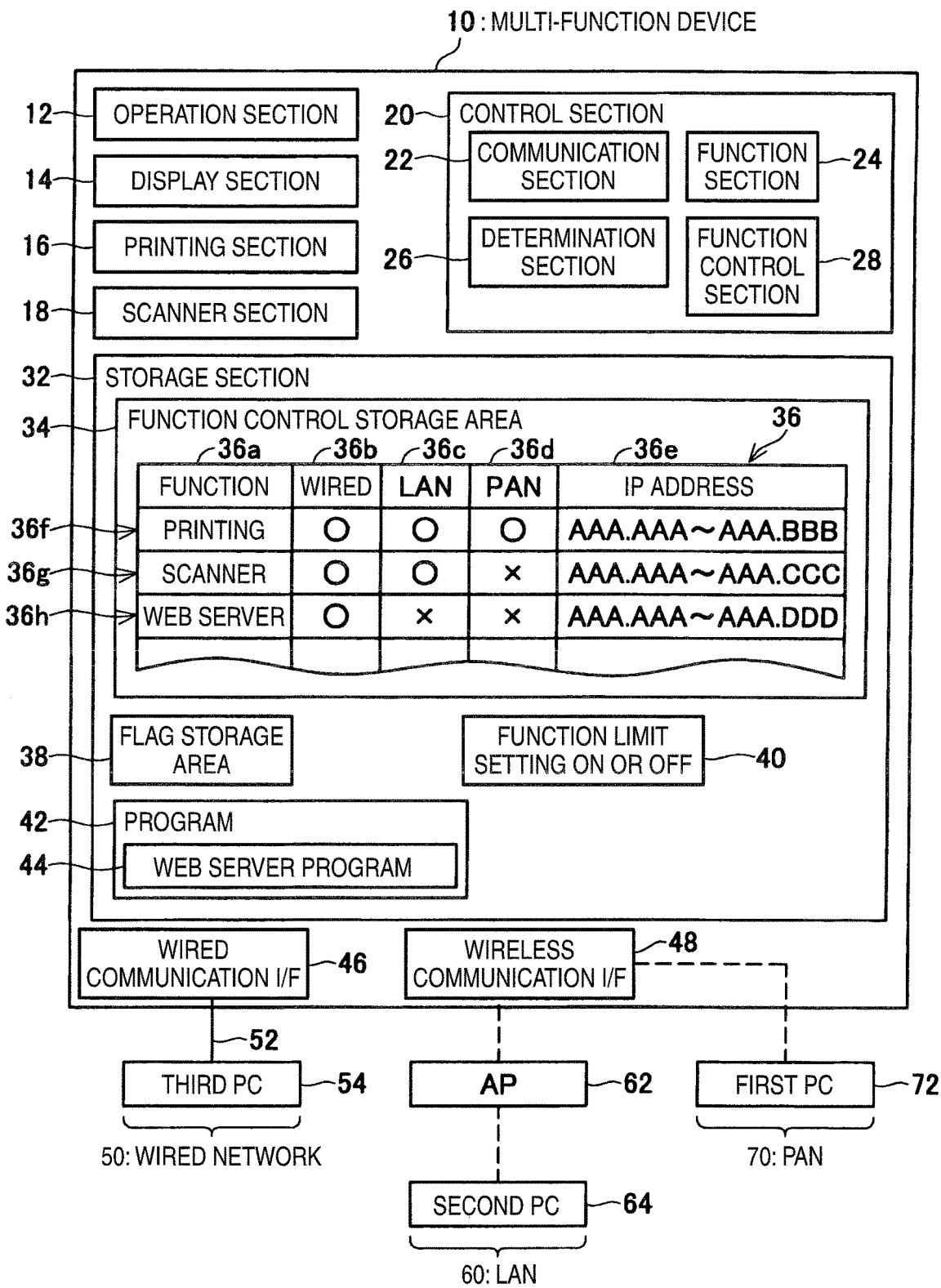
FIG. 1 shows an example of the configuration of a multi-function device.

An embodiment will be described with reference to FIG. 1. FIG. 1 shows the configuration of a multi-function device 10 of this embodiment, a wired network 50, a LAN (Local Area Network) 60, and a PAN (Personal Area Network) 70. The wireless network 50 includes a third PC 54. A plurality of devices including the third PC 54 (only the third PC 54 is shown in FIG. 1) is wired-connected in the wired network 50. The plurality of devices including the third PC 54 can mutually perform wired communication. The LAN 60 includes an access point (referred to as "AP" in the figure and hereinafter) 62 and a second PC 64. In the LAN 60, a plurality of devices including the second PC 64 (only the second PC 64 is shown in FIG. 1) is connected to be wirelessly communicable with the AP 62. The plurality of devices including the second PC 64 is mutually wirelessly communicable via the AP 62. The PAN 70 includes a first PC 72 having an AP function. The first PC 72 is a portable PC. For example, in the PAN 70, one device (for example, the multi-function device 10) other than the first PC 72 is connected to be wireless communicable with the first PC 72 as the AP. In this case, the device and the first PC 72 are mutually wirelessly communicable. For example, in the PAN 70, a plurality of devices other than the first PC 72 is connected to be wirelessly communicable with the first PC 72 as the AP. In this case, the plurality of devices described above is mutually wirelessly communicable via the AP provided in the first PC 72.

The AP function of the first PC 72 includes a function of My WiFi Technology proposed by Intel (registered trademark). The PAN 70 is different from that of Bluetooth (registered trademark). The PAN 70 is used for wireless communication on the basis of IEEE 802.11, while Bluetooth (registered trademark) is used for wireless communication on the basis of IEEE 802.15. When the first PC 72 exhibits the AP function, the plurality of devices included in the PAN 140 can perform communication via the first PC 72 (the AP of the first PC 72). On the other hand, in Bluetooth (registered trademark), the plurality of devices may not perform communication via other devices.

(Configuration of Multi-Function Device 10)

First, the configuration of the multi-function device 10 will be described. The multi-function device 10 includes an operation section 12, a display section 14, a printing section 16, a scanner section 18, a control section 20, a storage section 32, a wired communication interface (referred to as "wired communication I/F") 46, a wireless communication interface (referred to as "wireless communication I/F") 48, and the like.

The operation section 12 is constituted by a plurality of buttons to be operated by a user. The display section 14 displays various types of information. The scanner section 18 generates scan data by reading a document or the like set in the scanner section 18. The printing section 16 prints the print data from external devices (for example, the first PC 72, the second PC 64, the third PC 54, and the like) or the scan data generated by the scanner section 18. The printing section 16 and the scanner section 18 are controlled by a function section 24 to be described later.

The control section 20 is constituted by a CPU (not shown). The control section 20 executes various processes according to a program 42 stored in the storage section 32. As the control section 20 executes a process according to the program 42, the functions of a communication section 22, the function section 24, a determination section 26, and a function control section 28 are implemented.

The storage section 32 includes a function control storage area 34, a flag storage section 38, and the like. The function control storage area 34 stores a function limit table 36. The function limit table 36 includes a plurality of pieces of combination information 36f to 36h. Each piece of the combination information 36f to 36h is associated with information 36a indicating a function executable by the multi-function device 10, information 36b to 36d indicating the permission/prohibition of the use of a function, and information 36e indicating an IP address range. The information 36a indicating the function indicates one of a printing function, a scanner function, and a web server function. The information 36b to 36d indicating the permission/prohibition of the use of functions corresponds to one of a plurality of types of networks 50, 60, and 70. The information 36b indicates whether or not a device (for example, the third PC 54) included in the wired network 50 is permitted to use each function of the multi-function device 10. The information 36c indicates whether or not a device (for example, the second PC 64) included in the LAN 60 is permitted to use each function of the multi-function device 10. The information 36d indicates whether or not a device (for example, the first PC 72) included in the PAN 70 is permitted to use each function of the multi-function device 10. In the information 36b to 36d, the mark "O" indicates the permission of the use of a function, and the mark "X" indicates the non-permission (prohibition) of the user of a function. For example, in the combination information 36g, the mark "O" as the information 36b corresponding to the wired network 50 is associated with the scanner function and the mark "X" as the information 36d corresponding to the PAN 70 is associated with the scanner function. This means that the device included in the wired network 50 is permitted to use the scanner function, and that the device included in the PAN 70 is prohibited from using the scanner function.

The information 36e indicating the IP address range indicates an IP address range in which a function is permitted to be executed. Accordingly, a device having an IP address which is not included in the IP address range indicated by the information 36e is prohibited from executing the function. For example, in the combination information 36g, the mark "O" as the information 36b corresponding to the wired network 50 is associated with the scanner function, and an IP address range of "AAA.AAA to AAA.CCC" (hereinafter, referred to as "specific range") is associated with the scanner function. For example, if an IP address of the third PC 54 included in the wired network 50 is included in the above-described specific range, the third PC 54 is permitted to use the scanner function. On the other hand, for example, if the IP address of the third PC 54 is not included in the above-described specific range, the third PC 54 is prohibited from using the scanner function even though the information 36b corresponding to the wired network 50 is indicated by the mark "O". In the combination information 36g, the mark "X" as the information 36d corresponding to the PAN 70 is associated with the scanner function. Accordingly, the first PC 72 is prohibited from using the scanner function even though an IP address of the first PC 72 included in the PAN 70 is included in the above-described specific range.

The function limit table 36 is set by a manager of the multi-function device 10. For example, the manager can set new combination information (for example, 36f) in the multi-function device 10 by operating the operation section 12 of the multi-function device 10. Among a plurality of functions executable by the multi-function device 10, a function which is permitted to be used by all external devices is not included in the function limit table 36.

The flag storage area 38 stores the ON or OFF of a connection flag. The connection flag of the flag storage area 38 is changed by the determination section 26 of the control section 20.

The storage section 32 further stores function limit setting 40. The function limit setting 40 is switched between ON and OFF by allowing the manager to operate the operation section 12. If the function limit setting 40 is ON, the function control section 28 limits a function to be used by an external device using the function limit table 36. On the other hand, if the function limit setting 40 is OFF, the function control section 28 does not limit a function to be used by the external device. That is, the external device can use all of the plurality of functions executable by the multi-function device 10.

The storage section 32 further stores the program 42. The program 42 includes a basic program (not shown), a web server program 44, and the like. The basic program includes a program for causing the printing section 16 to execute printing, a program for causing the scanner section 18 to execute scanning, and the like. The web server program 44 is a program for enabling the multi-function device 10 to function as a web server. The external device can access the web server of the multi-function device 10 using its own web browser. A user of the external device can change setting of the multi-function device 10 in the web server of the multi-function device 10. An operation in which the control section 20 instructs the printing section 16 to execute printing according to the basic program corresponds to that in which the function section 24 executes the printing function. Likewise, an operation in which the control section 20 instructs the scanner section 18 to execute scanning according to the basic program corresponds to that in which the function section 24 executes the scanner function. Also, an operation in which the control section 20 executes a process according to the web server program 44 corresponds to that in which the function section 24 executes the web server function.

The wired communication I/F 46 is an interface for communicating with an external device (for example, the third PC 54) via a cable 52. The wireless communication I/F 48 is an interface for wirelessly communicating with external devices (for example, the AP 62 and the first PC 72). In FIG. 1, the dotted line between the wireless communication I/F 48 and the AP 62 indicates that the multi-function device 10 is wirelessly communicable with the AP 62. The other dotted lines of FIG. 1 also indicate that two devices are wirelessly communicable.

Wireless setup for a wireless connection of the multi-function device 10 to the LAN 60 and the PAN 70 is executed using automatic wireless setup (for example, WPS (Wi-Fi Protected Setup) arranged by Wi-Fi Alliance).

(Process to be Executed by Multi-Function Device 10)

Figure 2:
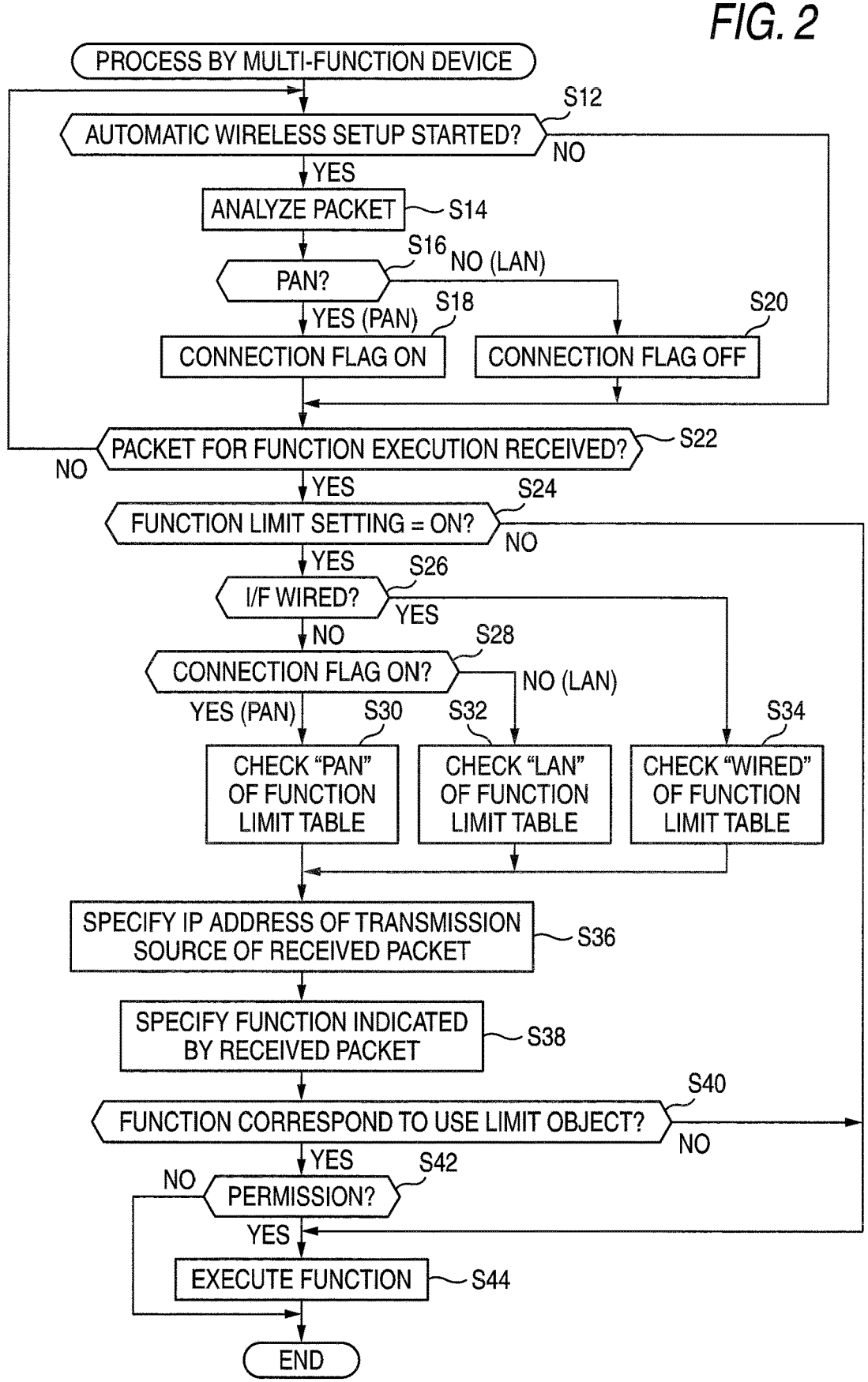
FIG. 2 shows a flowchart of a process to be executed by the multi-function device.

A process to be executed by the multi-function device 10 will be described with reference to FIG. 2. The communication section 22 of the multi-function device 10 monitors an operation of an automatic wireless setup button (not shown) of the multi-function device 10 by the user (S12). For example, when the user desires to connect the multi-function device 10 to the LAN 60, the automatic wireless setup button of the multi-function device 10 is operated and a predetermined button (not shown) of the AP 62 is operated. When the predetermined button has been operated, the AP 62 transmits a beacon signal toward a predetermined range around the AP 62. For example, when the user desires to connect the multi-function device 10 to the PAN 70, the automatic wireless setup button of the multi-function device 10 is operated, and a predetermined operation is performed in the first PC 72. When the above-described predetermined operation has been performed, the first PC 72 transmits a beacon signal toward a predetermined range around the first PC 72.

In the case of YES in S12, the communication section 22 transmits a probe request to a transmission source (the AP 62 or the first PC 72) of the beacon signal. Next, the communication section 22 receives a probe response as a response to the probe request. The communication section 22 analyzes the probe response (S14). Specifically, the communication section 22 checks whether or not specific information indicating the correspondence to My WiFi Technology is included in the probe response. The communication section 22 determines whether or not the multi-function device 10 is to be connected to the PAN 70 on the basis of the presence/absence of the specific information (S16). If the above-described specific information is included in the probe response, the communication section 22 determines that the network to be connected to the multi-function device 10 is the PAN 70 (YES in S16). On the other hand, if the above-described specific information is not included in the probe response, the communication section 22 determines that the network to be connected to the multi-function device 10 is the LAN 60 (NO in S16).

In the case of YES in S16, the communication section 22 sets the connection flag stored in the flag storage area 38 to be ON (S18). On the other hand, in the case of NO in S16, the communication section 22 sets the connection flag stored in the flag storage area 38 to be OFF (S20). Although not shown in the flowchart, the communication section 22 executes a connection process with a device (the AP 62 or the first PC 72: hereinafter, referred to as "transmission source device") of the transmission source of the probe response after S18 and S20 have been executed. This connection process includes the acquisition of wireless setup data (an authentication system and an encryption system) from the transmission source device, the transmission of a first signal, encrypted according to the acquired encryption system, to the transmission source device, the reception of a second signal, as a response to the first signal, from the transmission source device, and the like. The multi-function device 10 is connected to a wireless network including the transmission source device by executing the connection process. For example, when the transmission source device is the AP 62, the multi-function device 10 is connected to the LAN 60. For example, when the transmission source device is the first PC 72, the multi-function device 10 is connected to the PAN 70.

The communication section 22 further monitors the reception of a packet for executing a function from an external device (S22). If the packet has been received from a device (for example, the third PC 54) included in the wired network 50 via the wired communication I/F 46, or if the packet has been received from a device (for example, the AP 62) included in the wireless network (the LAN 60 or the PAN 70) via the wireless communication I/F 48, the determination result is YES in S22. In the case of YES in S22, the function control section 28 checks whether or not the function limit setting 40 of the storage section 32 is ON (S24). In the case of NO in S24, the process proceeds to S44. On the other hand, in the case of YES in S24, the determination section 26 determines whether or not the packet received in S22 has been received by the wired communication I/F 46 (S26). In the case of YES in S26, the function control section 28 reads information ("printing", "scanner", and "web server") 36a indicating functions and information ("O", "O", and "O") 36b corresponding to the wired network 50 from the function limit table 36 (S34).

On the other hand, in the case of NO in S26, the function control section 28 determines whether or not the connection flag stored in the flag storage area 38 is ON (S28). In a state in which the connection flag is ON, the multi-function device 10 is currently connected to the PAN 70 (see S18). Accordingly, for example, if the determination result of S28 is YES, this means that the packet received in S22 is a packet from the first PC 72 included in the PAN 70. In the case of YES in S28, the function control section 28 reads the information ("printing", "scanner", and "web server") 36a indicating the functions and information ("O", "X", and "X") 36d corresponding to the PAN 70 from the function limit table 36 (S30). On the other hand, in a state in which the connection flag is OFF, the multi-function device 10 is currently connected to the LAN 60 (see S20). Accordingly, for example, if the determination result of S28 is NO, this means that the packet received in S22 is a packet from the second PC 64 included in the LAN 60. In the case of NO in S28, the function control section 28 reads the information ("printing", "scanner", and "web server") 36a indicating the functions and information ("O", "O", and "X") 36d corresponding to the LAN 60 from the function limit table 36 (S32).

When one of S30 to S34 is ended, the process proceeds to S36. In S36, the function control section 28 specifies an IP address assigned to the transmission source device of the received packet of S22. The IP address of the transmission source device is included in the received packet of S22. The function control section 28 specifies the IP address by analyzing the packet received in S22. Subsequently, the function control section 28 specifies an indicated execution function by analyzing the received packet of S22 (S38).

Next, the function control section 28 determines whether or not the function (the indicated execution function) specified in S38 is a function of a use limit object (a function set in the table 36) (S40). Specifically, the function control section 28 determines whether or not the specified function of S38 is included in the functions ("printing", "scanner", and "web server") read in one of S30 to S34. In the case of YES in S40, the process proceeds to S42. In the case of NO in S40, the process proceeds to S44 by skipping S42.

In S42, the function control section 28 executes a first determination process and a second determination process. In the first determination process, the function control section 28 determines whether or not the function (the indicated execution function) specified in S38 corresponds to the mark "O" in the information 36b to 36d indicating the permission/prohibition of the use of the functions read in one of S30 to S34. For example, if the information 36c (Scanner Function="O") corresponding to the LAN 60 is read in S32 and the scanner function has been specified in S38, the determination result of the first determination process is YES. For example, if the information 36d (Scanner Function="X") corresponding to the PAN 70 is read in S30 and the scanner function has been specified in S38, the determination result of the first determination process is NO. In the case of NO in the first determination process, S44 is skipped and the process is ended. In this case, the function (the indicated execution function) specified in S38 is not executed.

In the case of YES in the first determination process, the function control section 28 executes the second determination process. In the second determination process, the function control section 28 first reads an IP address range associated with the specified function of S38 (the indicated execution function) from the function limit table 36. Next, the function control section 28 determines whether or not the specified IP address of S36 (the IP address assigned to the transmission source device of the received packet of S22) is included in the read IP address range. In the case of NO in the second determination process, S44 is skipped and the process is ended. In this case, the specified function of S38 (the indicated execution function) is not executed. On the other hand, in the case of YES in the second determination process, the process proceeds to S44.

In S44, the function section 24 executes the specified function of S38. For example, if the specified function of S38 is the printing function, the function section 24 supplies the printing section 16 with the print data included in the received packet of S22, and causes the printing section 16 to print the data. For example, if the specified function of S38 is the scanner function, the function section 24 causes the scanner section 18 to perform scanning. For example, if the specified function of S38 is the web server function, the function section 24 functions as the web server and transmits a web page to the transmission source device of the received packet of S22.

The multi-function device 10 of this embodiment has been described in detail. According to this embodiment, the multi-function device 10 can determine the permission/prohibition of the use, by an external device, of a function in response to a type of network including the external device. The multi-function device 10 is particularly useful in the following situation. The multi-function device 10 is installed in a conference room of a company. The multi-function device 10 is connectable to the PAN 70 including the first PC 72 of a person visiting the conference room from the outside of the company. The multi-function device 10 is communicable with the third PC 54 of an employee within the company by establishing the connection to the wired network 50 within the company. Also, the multi-function device 10 is communicable with the second PC 64 of an employee of the company included in the LAN 60 by establishing the connection to the LAN 60 within the company. According to the multi-function device 10, the second PC 64 or the third PC 54 of the employee within the company can be permitted to use a specific function (for example, the scanner function), and the first PC 72 of the person from the outside of the company can be prohibited from using a specific function (for example, the scanner function). That is, the multi-function device 10 can limit an operation in which the first PC 72 of the person from the outside of the company uses the above-described specific function.

Also, the multi-function device 10 can permit the third PC 54 included in the wired network 50 to use a predetermined function (for example, the web server function), and can prohibit the second PC 64 included in the LAN 60 from using the above-described predetermined function. That is, the multi-function device 10 can limit the use of the above-described predetermined function in response to a type of network including the PC 54 or 64.

Also, the multi-function device 10 can permit or prohibit the use of each function according to an IP address range. Thereby, the manager of the multi-function device 10 can set the permission/prohibition of the use of each function in more detail.

As is apparent from the above description, the LAN 60 of the embodiment corresponds to a first type of wireless network, and the PAN 70 of the embodiment corresponds to a second type of wireless network. The multi-function device 10 corresponds to a device. The first PC 72, the second PC 64, and the third PC 54 correspond to external devices. The scanner function of the embodiment corresponds to the first function and the second function. The web server function corresponds to the second function.

Specific examples have been described above, but they are only illustrative and do not limit the scope of the claims. Various changes and modifications in the specific examples illustrated above are included in the technology disclosed in the appended claims. Modified examples of the above-described embodiments are enumerated as follows.

(1) The function limit table 36 may be preset by a manufacturer of the multi-function device 10. In this case, the manager of the multi-function device 10 may change the function limit table 36.

(2) The multi-function device 10 may have a function of prohibiting the use by the second PC 64 included in the LAN 60 and a function of permitting the use by the first PC 72 included in the PAN 70.

(3) In the above-described embodiment, a WPS push button system is used for automatic wireless setup. Alternatively, a WPS PIN code system may be used.

(4) In the above-described embodiment, WPS is used as an automatic wireless setup mode, but, for example, AOSS (registered trademark) (AirStation One-Touch Secure System) or SES (Secure Easy Setup) may be used in place thereof. Alternatively, the multi-function device 10 may be connected to the LAN 60 or the PAN 70 using a manual wireless setup mode, not the automatic wireless setup mode. When the manual wireless setup mode is used, the user inputs wireless setup data to be set in the multi-function device 10 by operating the operation section 12. For example, the user selects one type of authentication system from among a plurality of types of authentication systems and selects one type of encryption system from among a plurality of types of encryption systems.

(5) A technique of the above-described embodiment is applicable to other devices such as a PC, a server, a printer, a scanner, a phone, and a facsimile as well as the multi-function device 10.

The technical elements described in this specification or the drawings exhibit technical utility when used alone or in various combinations, and are not limited to the combinations described in the claims as filed. The technique illustrated in this specification or the drawings can achieve a plurality of objects at the same time, and the technical utility can be provided by achieving one object thereof itself.

What is claimed is:

1. A device comprising:
a wireless communication interface configured to be used in connecting with a wireless local area network (LAN) and configured to be used in connecting with a wireless personal area network (PAN), wherein the wireless LAN is a wireless network configured by an access point, and the wireless PAN is a wireless network configured by a terminal device having an access point function; and
a controller comprising hardware and configured to:
communicate with an external device via the wireless communication interface;
execute a plurality of functions that can be used by the external device when the external device performs the communication;
receive an execution instruction for a specific function among the plurality of functions from the external device via the wireless communication interface;
determine which of the wireless LAN and the wireless PAN the external device belongs to, upon receiving the execution instruction for the specific function via the wireless communication interface;
specify which among the plurality of functions the specific function is; and
permit or prohibit the use, by the external device, of the specific function based on a result of the determining and a result of the specifying,
wherein:
when it is determined that the external device belongs to the wireless LAN, upon receiving the execution instruction for the specific function from the external device via the wireless communication interface, the specific function being specified to a first function among the plurality of functions, permit the external device to use the first function when an IP address of the external device is included in a specific range, the first function being one of a printing, a scanning and a web server,
when it is determined that the external device belongs to the wireless PAN, upon receiving the execution instruction for the specific function from the external device via the wireless communication interface, the specific function being specified to the first function among the plurality of functions, prohibit the external device to use the first function, and
when the specific function is specified to a second function, permit the external device to use the second function even when it is determined that the external device belongs to either of the wireless LAN and the wireless PAN, upon receiving the execution instruction for the specific function from the external device via the wireless communication interface, the second function being one of the printing, the scanning and the web server, the second function being different from the first function,
wherein the controller is configured to prohibit the external device from using the first function when it is determined that the external device belongs to the wireless LAN upon receiving the execution instruction for the specific function from the external device via the wireless communication interface, the specific function being specified to the first function among the plurality of functions, and the IP address of the external device is not included in the specific range.

2. The device according to claim 1, wherein the device is connectable to a wired network, and
the controller is further configured to determine which of the wired network and a wireless network includes the external device, and
the controller is configured:
to permit the external device to use the second function among the plurality of functions when it is determined that the external device is included in the wired network.

3. A non-transitory computer readable medium storing a program which when executed by a processor causes the processor to perform a process comprising:
communicating with an external device through a wireless communication interface, the wireless communication interface configured to be used in connecting with a wireless local area network (LAN) and configured to be used in connecting with a wireless personal area network (PAN), wherein the wireless LAN is a wireless network configured by an access point, and the wireless PAN is a wireless network configured by a terminal device having an access point function;
executing a plurality of functions that can be used by the external device when the external device performs the communication;
receiving an execution instruction for a specific function among the plurality of functions from the external device via the wireless communication interface;
determining which of the wireless LAN and the wireless PAN the external device belongs to, upon receiving the execution instruction for the specific function from the external device via the wireless communication interface;
specifying which among the plurality of functions the specific function is; and
permitting or prohibiting the use, by the external device, of the specific function based on a result of the determining and a result of the specifying,
wherein:
when it is determined that the external device belongs to the wireless LAN, upon receiving the execution instruction for the specific function from the external device via the wireless communication interface, the specific function being specified to a first function among the plurality of functions, the program instructs the processor to permit the external device to use the first function when an IP address of the external device is included in a specific range, the first function being one of a printing, a scanning and a web server,
when it is determined that the external device belongs to the wireless PAN, upon receiving the execution instruction for the specific function from the external device via the wireless communication interface, the specific function being specified to the first function among the plurality of functions, the program instructs the processor to prohibit the external device to use the first function, and
when the specific function is specified to a second function, permit the external device to use the second function even when it is determined that the external device belongs to either of the wireless LAN and the wireless PAN, upon receiving the execution instruction for the specific function from the external device via the wireless communication interface, the second function being one of the printing, the scanning and the web server, the second function being different from the first function, wherein the program further instructs the processor to prohibit the external device from using the first function when it is determined that the external device belongs to the wireless LAN upon receiving the execution instruction for the specific function from the external device via the wireless communication interface, the specific function being specified to the first function among the plurality of functions, and the IP address of the external device is not included in the specific range.

4. The device according to claim 1, wherein the first function is the scanning function, and wherein the second function is the printing function.

\* \* \* \* \*